(12) United States Patent
Adiletta et al.

(10) Patent No.: US 7,882,545 B2
(45) Date of Patent: Feb. 1, 2011

(54) SECURE WIRELESS NETWORK

(75) Inventors: Matthew Adiletta, Bolton, MA (US);
Bapi Vinnakota, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 1381 days.

(21) Appl. No.: 11/300,016

(22) Filed: Dec. 14, 2005

(65) Prior Publication Data

US 2007/0136596 A1 Jun. 14, 2007

(51) Int. Cl.
*H04L 9/00* (2006.01)
*G06F 21/00* (2006.01)

(52) U.S. Cl. .................... 726/4; 380/270; 713/168
(58) Field of Classification Search ............ 380/273, 380/168; 726/34
See application file for complete search history.

(56) References Cited

U.S. PATENT DOCUMENTS

| | | | |
|---|---|---|---|
| 6,542,735 B1 * | 4/2003 | Carley | 455/420 |
| 7,668,533 B2 * | 2/2010 | Hagiwara | 455/411 |
| 2002/0174335 A1 | 11/2002 | Zhang et al. | |
| 2004/0264699 A1 * | 12/2004 | Meandzija et al. | 380/270 |

FOREIGN PATENT DOCUMENTS

| EP | 1526444 A | 4/2005 |
|---|---|---|
| JP | 2004 023736 A | 1/2004 |
| WO | WO 2007/070357 | 8/2007 |

OTHER PUBLICATIONS

European Office Action dated Oct. 7, 2009, European Patent Application No. 06 839-172.1-2413, filed Dec. 6, 2006, 3 pages.
PCT/US2006/046777, PCT International Preliminary Report on Patentability and Written Opinion of the International Searching Authority, issued Jun. 18, 2008, 7 pages.

* cited by examiner

*Primary Examiner*—Gilberto Barron, Jr.
*Assistant Examiner*—Devin Almeida
(74) *Attorney, Agent, or Firm*—Blakely, Sokoloff, Taylor & Zafman LLP

(57) ABSTRACT

A method is used to authenticate a wireless device for secure operation on a wireless local area network, the wireless local area network including a controller. The method to include broadcasting from the controller a configuration message based on the controller being physically switched to a configuration mode. The method to also include accepting at the controller a response from the wireless device, the response accepted based on receiving the response within a fixed time period following the broadcasting of the configuration message, the accepted response including information encrypted using the controller's public key. A user message is obtained, the user message entered by the user at the controller and maintained at the controller. The wireless device is authenticated based on whether the response including the encrypted information, when decrypted with a private key associated with the controller's public key, matches the user message.

17 Claims, 5 Drawing Sheets

SECURE WIRELESS NETWORK

BACKGROUND

Wireless local area networks (WLANs) are becoming a common way to network or interconnect devices with wireless capabilities in a residential or business setting. However, one disadvantage with using a WLAN is the possibility that sensitive or private information may be accessed, modified, or intercepted by an unauthorized party. These problems may be mitigated or reduced by setting up a secure WLAN that uses a cryptographic system to encrypt information exchanged between devices interconnected in a WLAN. In this secure WLAN, only those authorized have the ability to decrypt encrypted information. Thus, even if the encrypted information is intercepted by an unauthorized party, the encrypted information is not intelligible without the ability to decrypt the information. In this manner, an insecure WLAN may act functionally like a private and secure network.

One example, of a cryptographic system is a public key cryptographic system. The basic components of a public key cryptographic system include a cryptographic algorithm and two numerical codes called keys, one of which is referred to as a public key and the other a private key. For encryption, information encrypted with the public key (or public encryption key) can only be decrypted with the private key (or private decryption key). For example, if a message is encrypted with the public key, only the holder of the associated private key can recover the original message. Even the originator of the message, absent the private key associated with the public key, cannot decrypt the message.

Another example of a cryptographic system for a secure WLAN is a system designed for WLAN networks. One such system is described in the Institute for Electrical and Electronic Engineers (IEEE) 802.11i standard for medium access control (MAC) security enhancements. See *IEEE* 802.11i-2004: IEEE Standard for Information technology—Telecommunications and information exchange between systems—Local and metropolitan area networks—Specific requirements Part 11: WLAN MAC and Physical Layer (PHY) Specifications, Amendment 6: MAC Security Enhancements, published July 2004, and/or later versions of the standard (the "802.11i standard"). In this cryptographic system, following the authentication of a device, a controlling agent of a WLAN may exchange a pairwise master key (PMK) with each authenticated device. The PMK, for example, is then used for secure 802.11i operations or communications on the WLAN.

DETAILED DESCRIPTION

Figure 1:
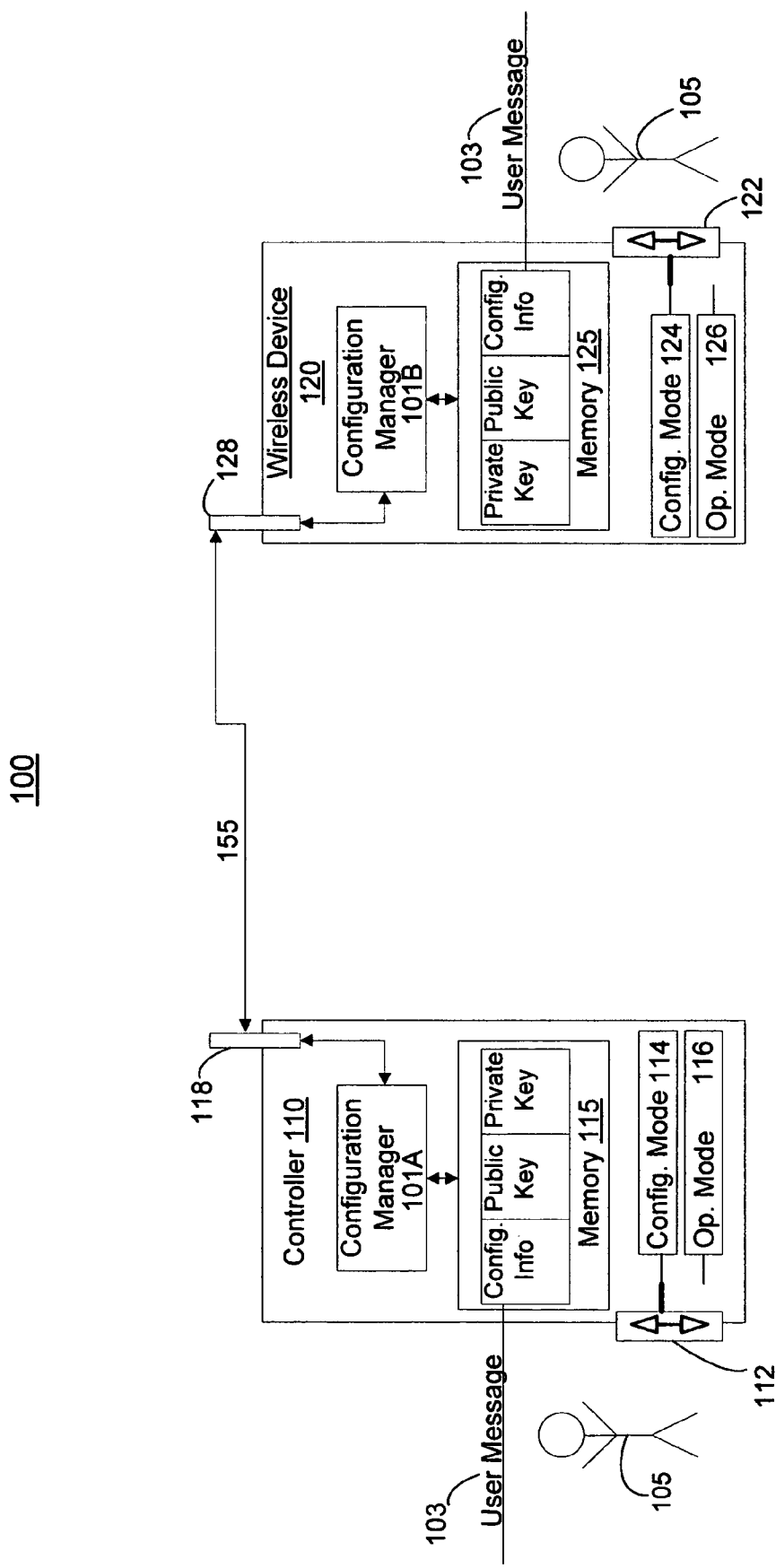
FIG. 1 is an illustration of elements of an example wireless local area network (WLAN) including a controller and at least one wireless device.

As mentioned in the background, a cryptographic system may be used to establish a secure WLAN. However, to use a cryptographic system, the interconnected devices in a WLAN must authorize or authenticate each other. Otherwise, a rogue or unwanted device may become or mimic an authorized device and compromise the security of the WLAN by obtaining information (e.g., public or private keys) to decrypt encrypted information.

Typically, to avoid a rogue device compromising a secure WLAN, various authentication methods are used. These methods may require that a user physically enter key information s provided by some central authority (e.g., the manufacturer, an external authentication server, etc.) at each device. This physical entry may include entering a long string of alpha numeric characters via a keyboard or other input/output mechanism (e.g., a universal serial bus (USB) flash drive, remote control, touch screen, etc.) for a device to securely connect to the WLAN. Once the key information is correctly entered, the device is authenticated and treated as an authorized member of the secure WLAN.

This authentication process may be problematic should the key information be lost or obtained by a rogue or unauthorized device. If lost, the device desiring to be an authorized member may have no way to authenticate itself if the device needs to couple to another secure WLAN or is reset and needs to re-authenticate itself. If the key information is obtained by a rogue device, that rogue device may obtain access to the WLAN and compromise the security of the WLAN. The possibility that the key information may physically exist as a writing on paper or stored in a memory on a device that could be accessed or hacked, increases the likelihood that a WLAN may be compromised by a rogue device. Additional steps can be taken to protect the key from a rogue device, but each additional step adds a level complexity to a process that is already complex. This is problematic to a typical user configuring a residential WLAN whose tolerance for added complexity is low.

In one example, a method is used to authenticate a wireless device for secure operation on a wireless local area network (WLAN) that includes a controller physically switched into a configuration mode by a user. The method includes broadcasting from the controller a configuration message, the configuration message to include the controller's public key. Based on receiving a response from the wireless device within a fixed time period following the broadcasting of the configuration message, the controller accepts the response from the wireless device. The accepted response may include information encrypted using the controller's public key. The controller may obtain a user message entered by the user at the controller and maintained at the controller. The wireless device is then authenticated based on whether the response including the encrypted information, when decrypted with a private key associated with the controller's public key, includes the user message.

FIG. 1 is an illustration of elements of an example wireless local area network (WLAN) 100 including controller 110 and wireless device 120. In one example, controller 110 is a main, central, or controlling configuration agent for WLAN 100. Controller 110 may be an access point (AP) connected to another network. This other network, may include, but is not limited to, a wired local area network, a wired wide area network or a wireless wide area network.

In one implementation, controller 110 and wireless device 120 are coupled in communication via a wireless communication link 155 through transceivers 118 and 128, respectively. In one example, wireless communication link 155 may be established and/or maintained in accordance with one or more industry standards. These standards may describe communication protocols and operating parameters to interconnect devices with wireless networking capabilities (e.g., include an antenna and a network interface). One such group of industry standards is known as the IEEE 802.11 standards (e.g., 802.11a, 802.11b, 802.11g or 80211n, etc.). This disclosure is not limited to only WLANs operating according to IEEE 802.11 standards.

In one example, controller 110 includes configuration switch 112 and wireless device 120 includes configuration switch 122. As depicted in FIG. 1, configuration switch 112 is in a position such that controller 110 is in a configuration mode 114. Also as depicted in FIG. 1, configuration switch 122 is in a position to place wireless device 120 in configuration mode 124. In one example, a user 105 may have physically placed configuration switches 112, 122 into configuration modes 114, 124, respectively.

In one implementation, while in configuration mode 114, 124, user 105 enters a user message 103 into both controller 110 and wireless device 120. In one example, user 105 may enter user message 103 via a keyboard or other input/output mechanism, e.g., a universal serial bus (USB) flash drive, remote control, touch screen, etc. This user message 103 may be temporarily stored in memory 115 and 125 for controller 110 and wireless device 120, respectively. User message 103 may be any message determined by user 105. However, in one example, complexity constraints are placed on the contents of user message 103 to ensure it is not too easily discovered or guessed.

As described in more detail below, once controller 110 is placed in configuration mode 114, configuration manager 101A in controller 110 broadcasts a configuration message to indicate that WLAN 100 is being configured or established for secure operation. For example, in an IEEE 802.11 implementation, the configuration message includes a public access service set identifier (SSID) and controller 110's public key for a public cryptographic system as described above in the background.

In this IEEE 802.11 implementation, wireless device 120 responds to the configuration message broadcasted by controller 110 via wireless communication link 155. This response includes wireless device 120 associating with the SSID. The response also includes configuration manager 101B in wireless device 120 using controller 110's public key. Configuration manager 101B uses the public key to encrypt the user message 103 temporarily stored in memory 125. Configuration manager 101B then places the encrypted user message 103 in a response message to controller 110. The response message may also include other information such as wireless device 120's public key encrypted using controller 110's public key. The response is then be transmitted through transceiver 128 via wireless communication link 155 to controller 110.

In one example, controller 110 only accepts response messages within a fixed or predetermined time period. Thus, if wireless device 120's response message to the configuration message is not received within that fixed time period, the response message is not accepted or is ignored. If the response message is received before the expiration of the time period, configuration manager 101A decrypts the portion of the response message that includes user message 103. That portion is decrypted using a private key associated with controller 110's public key. If the decrypted portion of the message matches or includes user message 103, then wireless device 120 is authenticated and is deemed an authorized member of WLAN 100.

In one implementation, configuration manager 101A in controller 110 then transmits a controller authentication message to wireless device 120 through transceiver 118 via wireless communication link 155. The controller authentication message to include user message 103 encrypted using wireless device 120's public key.

In one example, wireless device 120 receives the controller authentication message. Configuration manager 101B in wireless device 120 then decrypts the controller authentication message portion that includes user message 103. The message is decrypted using a private key associated with wireless device 120's public key. If the decrypted portion of the message matches or includes user message 103 stored in memory 125, controller 110 is authenticated and is recognized by wireless device 120 as a controlling agent for WLAN 100.

In one example, after controller 110 and wireless device 120 have authenticated each other, configuration switches 112 and 122 are placed into operation mode 116 and 126, respectively. In an alternative example, configuration switches 112, 122 may not have two modes but just a configuration switch that can be physically switched on/off or simply just toggled from one position to another position and back to the one position. Thus, in this alternative example, switching on or toggling configuration switch 112, 122 places controller 110 and wireless device 120 back in a configuration mode.

In one example, WLAN 100 operates in compliance with a cryptographic system described in the 802.11i standard. Thus, following the authentication of wireless device 120, information related to a pairwise master key (PMK) for secure 802.11i operations may also be included in the controller authentication message by controller 110.

In one implementation, the public key cryptographic system is used only to authenticate the wireless devices and the controller. After authentication, an 802.11i cryptographic system is used for secure operations on WLAN 100. The limited amount of time that controller 110 accepts responses to a configuration message broadcast places a time constraint for using the public key cryptographic system on WLAN 100. Thus, exposure of the WLAN to a rogue agent obtaining public/private keys is possibly minimized.

In one example, for an added level of security, a time limit may be placed on a period of time that a wireless device is away from WLAN 100 and still maintains its authorized status for secure operations on WLAN 100. A notebook computer, for example, is authenticated as described above. This notebook computer may be removed from WLAN 100 and does not return for an extended period of time. If this extended period of time exceeds the time limit, then the notebook computer will have to be authenticated again as described above to regain its authorized status for secure operations on WLAN 100.

Figure 2:
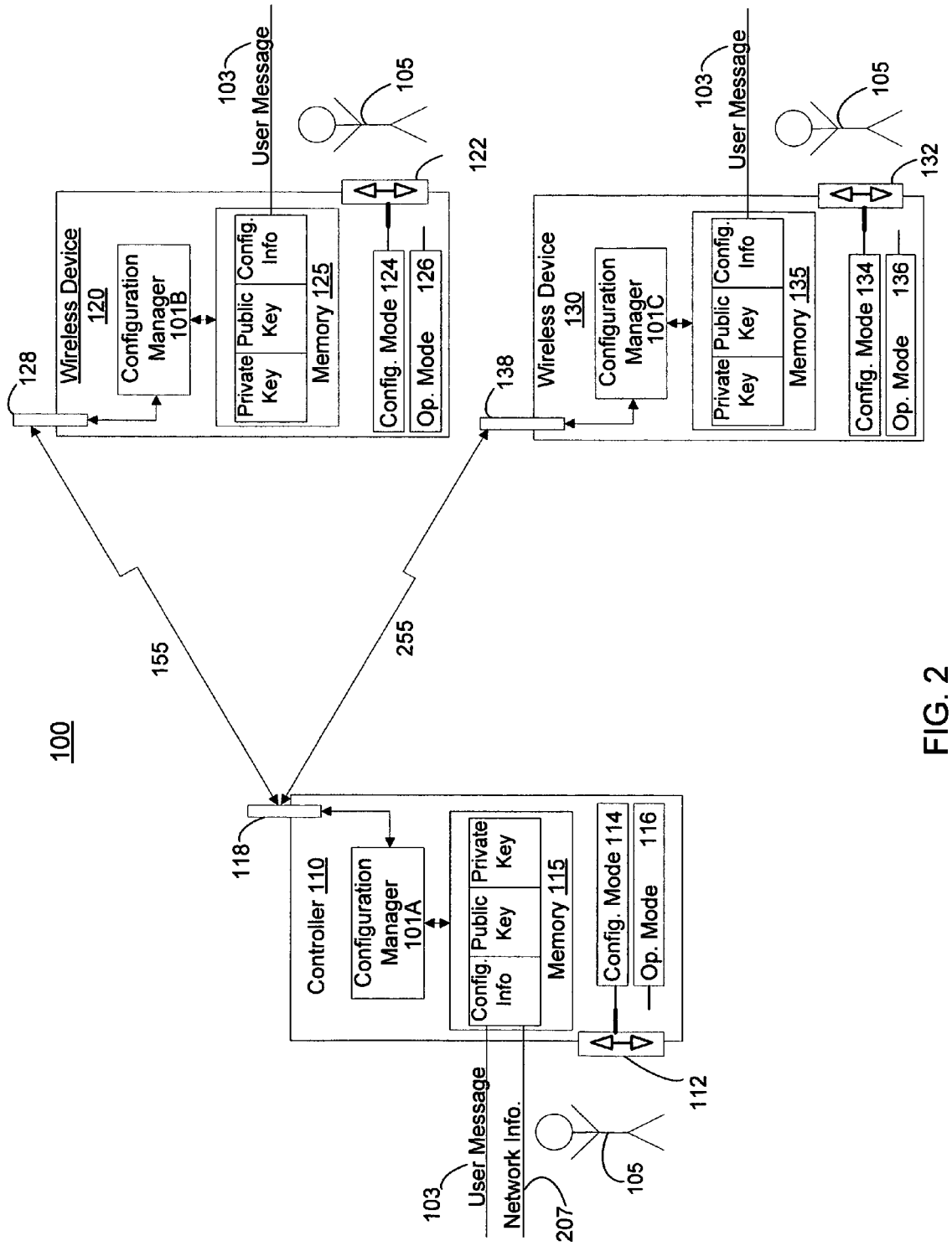
FIG. 2 is an illustration of elements of the example WLAN including the controller and multiple wireless devices.

FIG. 2 is an illustration of elements of WLAN 100 including controller 110 and wireless devices 120 and 130. In FIG. 2, another wireless device 130 is portrayed as coupling in communication to controller 110 via wireless communication link 255.

In one implementation, user 105 enters network information 207 and user message 103 into controller 110. In one example, user 105 may enter network information 207 and user message 103 via a keyboard or other input/output mechanism, e.g., a universal serial bus (USB) flash drive, remote control, touch screen, etc. Network information 207 and user message 103 may be temporarily stored in memory 115. In this implementation, network information 207 is used to provide an added level of security to establish a secure WLAN 100.

In one example, network information 207 includes information associated with elements to be coupled to WLAN 100.

This information may include the number of wireless devices user 105 expects to configure for secure operation on WLAN 100. The information may also include the types of wireless devices that are to be configured. For example, wireless device 120 or wireless device 130 includes various types of devices that have wireless capabilities. These devices include, but are not limited to, laptop, notebook or desktop computers, printers, scanner, televisions, television set-top boxes, digital video recorders, video cassette recorders, stereos, receivers, appliances, personal digital assistant, etc. Network information 207 may also include the function that each type of wireless device serves as part of WLAN 100. For example, a printer may be a network printer or may function as a dedicated printer for one or more notebook or desktop computers.

In one example, wireless device 120 is a notebook computer and wireless devise 130 is a printer. In this example, configuration manager 101B in wireless device 120, when responding to a configuration message broadcast from controller 110, also includes information in a response message that includes type information (notebook) or function (e.g., a network user node). Configuration manager 101C in wireless device 130 also includes information in its response message that includes type information (printer) or function (e.g., network or dedicated printer). As controller 110 authenticates these devices, the type and/or function information in the response message is compared to network information 207 by configuration manager 101A. If the information does not match, the wireless device(s) is not authenticated and is not authorized for secure operations or possibly not allowed to communicate to other elements of WLAN 100.

In one example, in addition to a fixed time period to accept response messages, controller 110 stops accepting response messages after a specified number is received. This specified number may be based on the number of wireless devices entered by user 105 in network information 207. If user 105 expected to only configure wireless devices 120 and 130 for WLAN 100, then the number entered would be 2. As a result, controller 110 would ignore response messages after receiving 2 response messages from 2 wireless devices. In another example, controller 110 aborts configuration altogether if the type and/or number don't match at any point during the configuration process.

In one example, if the number and/or type entered by user 105 in network information 207 do not match, user 105 receives a visual or audio indication. This visual or audio indication may indicate to user 105 that a rogue or unauthorized device is attempting to gain access to WLAN 100. For example, a monitor display for a desktop computer flashes a certain color (e.g., red) or flashes a text warning on the display. In another example, an audio alarm sounds.

In one implementation, controller 110 can only broadcast one configuration message to wireless devices each time configuration switch 112 is physically switched to configuration mode 114. Thus, in one example, user 105 decides to add one or more other wireless devices to WLAN 100. User 105 physically switches configuration switch 112 into configuration mode 114 and enters a user message and possibly network information to reflect the number of wireless devices to be added to WLAN 100. Controller 110 then broadcasts a configuration message as described above and the one or more other wireless devices will be authenticated as described above.

In one implementation, user 105 monitors each wireless device that responds to a configuration request. As a result, user 105 manually accepts or rejects each monitored wireless device that sends a response message. In this implementation, user 105 stops the acceptance of response messages once the anticipated number of response messages associated with wireless devices to be configured is received. User 105 also examines the type or function of the device to ensure it is what is expected. If the type or function does not match, user 105 prohibits the wireless device from joining WLAN 100. For example, not authenticate the device and/or manually accept the response message associated with the device, e.g., select a reject option when prompted via a display monitor coupled to controller 110.

Figure 3:
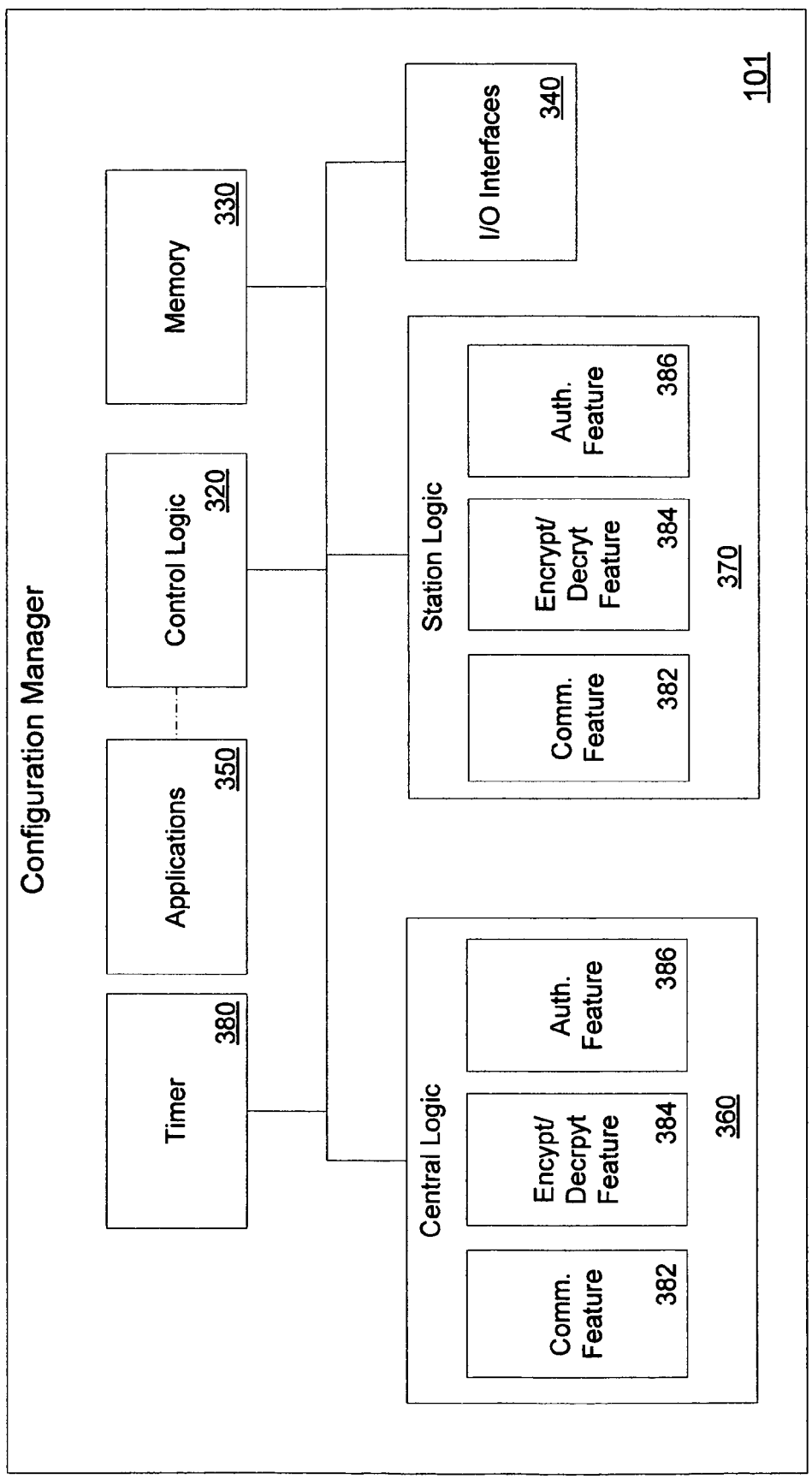
FIG. 3 is a block diagram of an example configuration manager architecture.

FIG. 3 is a block diagram of an example configuration manager 101 architecture. In FIG. 3, configuration manager 101 includes central logic 360, station logic 370, control logic 320, memory 330, input/output (I/O) interfaces 340, timer 380 and optionally one or more applications 350, each coupled as depicted. In one example, configuration manager 101 uses central logic 360 when implemented within a controller (e.g., controller 110) and uses station logic 370 when implemented within a wireless device that is not the controller (e.g., wireless device 120 or 130).

In one example, the elements portrayed in FIG. 3's block diagram are controller or wireless device resources allocated to support or enable configuration manager 101 as described in this disclosure. For example, central logic 360, control logic 320 and station logic 370 each or collectively represent any of a wide variety of logic device(s) or executable content a controller or wireless device allocates to implement a configuration manager 101. These logic device(s) may include a microprocessor, network processor, service processor, microcontroller, field programmable gate array (FPGA), application specific integrated circuit (ASIC), or executable content to implement such control features, or any combination thereof In FIG. 3, both central logic 360 and station logic 370 include communicate feature 382, encrypt/decrypt feature 384 and authenticate feature 386. In one implementation, central logic 360 and station logic 370 use these features to configure a controller and/or wireless device for secure operations on a WLAN.

Control logic 320 may control the overall operation of configuration manager 101 and as mentioned above, may represent any of a wide variety of logic device(s) or executable content to implement the control of configuration manager 101. In alternate examples, the features and functionality of control logic 320 are implemented within central logic 360 and/or station logic 370.

According to one example, memory 330 is used by central logic 360 or secondary logic 370 to temporarily store information. For example, information related to the comparing of user messages and/or network information by controllers or wireless devices. Memory 330 may also store executable content. The executable content may be used by control logic 320, central logic 360 or station logic 370 to implement or activate features or elements of configuration manager 101.

In one implementation, memory 330 is a block of memory within and/or accessible to a controller or wireless device (e.g., memory 115, 125, 135). In this implementation, memory 330 temporarily stores configuration information entered by a user (e.g., user 105) attempting to configure devices to operate on a secure WLAN (e.g., WLAN 100). Thus, as described above, configuration manager 101 obtains this temporarily stored configuration information and uses it to establish or configure the devices to operate on the secure WLAN.

I/O interfaces 340 may provide an interface via a communication medium or link between configuration manager 101 and a user desiring to configure a controller or wireless device to operate on a secure WLAN. As a result, I/O interfaces 340 may enable central logic 360, control logic 320 or station logic 370 to receive a series of instructions initiated by a user wanting to configure a controller or wireless device. The series of instructions may activate central logic 360, control logic 320 or station logic 370 to implement one or more features of configuration manager 101.

In one example, configuration manager 101 includes one or more applications 350 to provide internal instructions to control logic 320. Such applications 350 may be activated to generate a user interface, e.g., a graphical user interface (GUI), to enable administrative features, and the like. For example, a GUI provides a user access to memory 330 to modify or update information (e.g., configuration information, public and private keys, user message) to configure a controller or wireless device.

In one example, timer 380 includes a timing device responsive to central logic 360 and/or control logic 320. Timer 380 is used to establish a window or time period via which response messages to a configuration message are accepted. In other examples, the features and functionality of timer 380 are implemented within control logic 320 and/or central logic 360.

Figure 4:
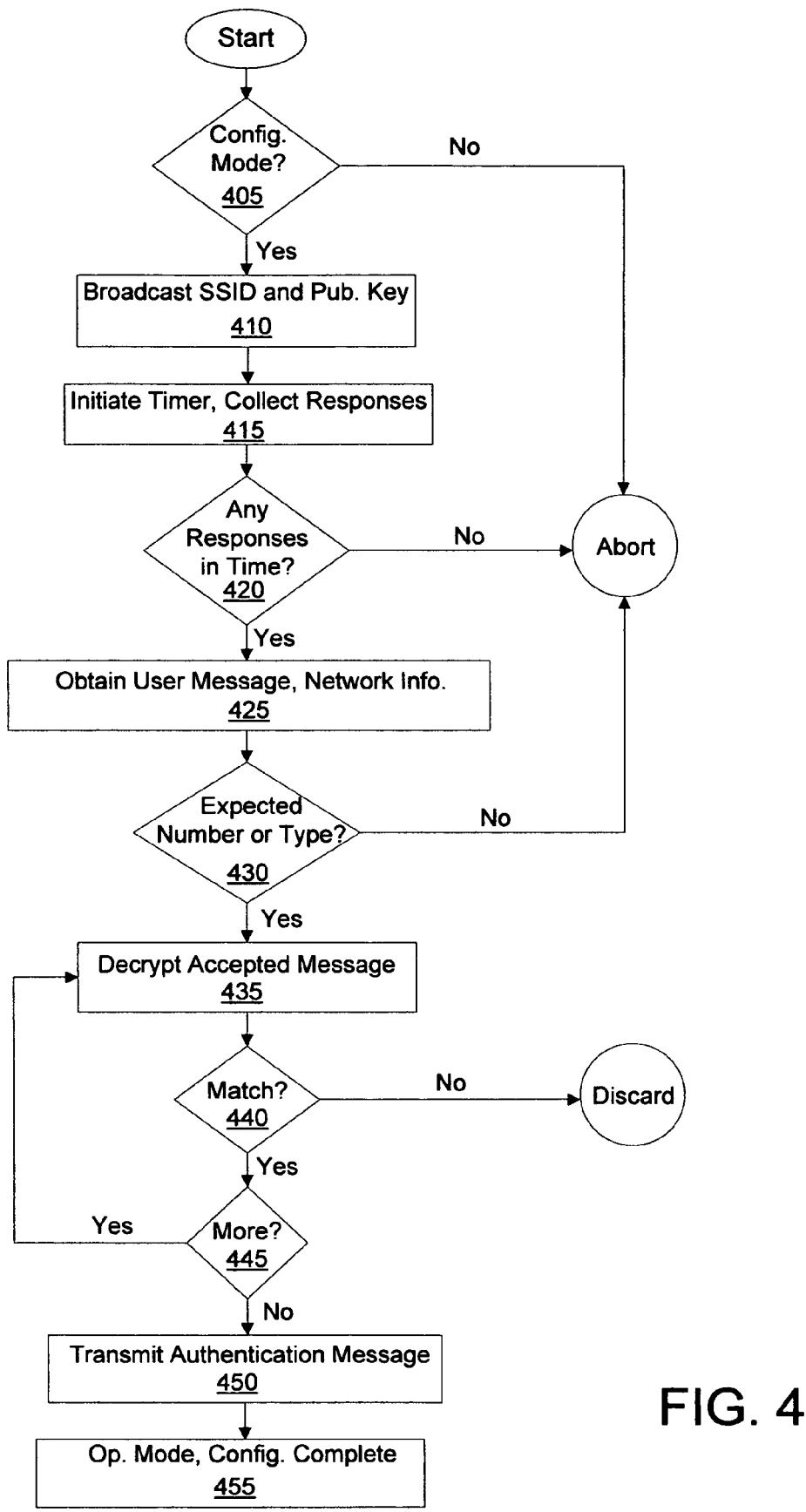
FIG. 4 is a flow chart of an example method to authenticate a wireless device.

FIG. 4 is a flow chart of an example method to authenticate a wireless device for secure operation on WLAN 100. In one example, WLAN 100 is to use the private key cryptographic system to facilitate the authentication of wireless devices to then securely operate in compliance with the 802.11i standard on WLAN 100.

In block 405, in one example, central logic 360 of configuration manager 101A in controller 110 activates communicate feature 382. Communicate feature 382 determines whether configuration switch 112 has been placed into configuration mode 114 (e.g., by user 105). If configuration switch 112 is in configuration mode 114, the configuration process moves to block 410. If configuration switch 112 is in operation mode 114, the configuration process is aborted.

In block 410, in one example, communicate feature 382 broadcasts via transceiver 118 a configuration message. In one example, the configuration message includes the public access SSID associated with controller 110 and WLAN 100. The configuration message also includes controller 110's public key.

In block 415, in one example, central logic 360 activates authenticate feature 386. Authenticate feature 386 initiates timer 380 to begin a time period to collect responses to the configuration message broadcasted by communicate feature 382. The time period may be based on a short period of time to minimize the time a rogue or unauthorized wireless device can respond to the configuration message. In one example, this period of time is just long enough for a wireless device to receive, process the configuration message and respond.

In block 420, in one example, a response message to the configuration message is received from those wireless devices associating with the public access SSID. The response messages, for example, include information such as user message 103 and a responding wireless device's public key. User message 103 may have been physically entered by user 105 at wireless device 120 and/or 130. User message 103 is encrypted by the wireless device using controller 110's public key and included in the response message.

If a wireless device's response message is received prior to timer 380 expiring, authenticate feature 386 accepts the response message and the process moves to block 430. If timer 380 expires before the wireless device's response message is rejected. In one example, if wireless device 120 is the only device to be configured or no other wireless devices are to be configured, the configuration process is aborted.

In block 425, in one example, authenticate feature 386 obtains user message 103 and network information 207 from a memory resident in or accessible to controller 110. In one example, user message 103 and network information 207 were entered by user 105 and at least temporarily stored in the resident memory, e.g., memory 115.

In block 430, in one example, authenticate feature 386 compares the obtained network information 207 to the wireless device response message received and accepted. For example, network information 207 includes the number and types of wireless devices expected to be configured. The response message, as described above for FIG. 2, also includes information to indicate the type of wireless device that generated the response message. If network information 207 matches the number and types of wireless devices expected, the process moves to block 430. If network information 207 does not match, the configuration process is aborted.

In block 435, in one example, central logic 360 activates decrypt/encrypt feature 384. Decrypt/encrypt feature 384, uses a private key associated with controller 110's public key to decrypt at least a portion of an accepted response message.

In block 440, in one example, authenticate feature 386 compares the decrypted portion of the accepted response message to user message 103 obtained in block 425. If the decrypted portion matches the user message 103, the wireless device associated with that response message is authenticated. The public key included in the response message is at least temporarily stored in a memory (e.g., memory 330 or memory 115). If the decrypted portion does not match, the wireless device associated with that response is not authenticated and is not authorized for secure operation on WLAN 100. In this non-matching example, the response message for that wireless device is discarded.

In block 445, in one example, authenticate feature 386 determines whether there are any more accepted response messages received from wireless devices to be authenticated. If there are no more, the process moves to block 450. If there are more, the process returns to block 435.

In block 450, in one example, encrypt/decrypt feature 384 obtains the public key stored by authenticate feature 386 for each authenticated wireless device. For example, if wireless device 120 was authenticated, authenticate feature 386 uses wireless device 120's public key to encrypt information in an authentication message. This authentication message includes user message 103 and also a pairwise master key for 802.11i operation. This authentication message is transmitted to each authenticated wireless device.

In block 455, in one example, configuration switch 112, is physically switched (e.g., by user 105) to operation mode 116. As a result, from the perspective of controller 110, configuration of wireless devices to be coupled to WLAN 100 for secure 802.11i operations is complete. In one example, another configuration process is initiated if configuration switch 112 is physically switched back into configuration mode 114. This may occur, as mentioned above, if one or more other wireless devices are to be added to WLAN 100, if WLAN 100 needs to be reconfigured, or if a previously authenticated wireless device leaves WLAN 100 for an excessive time and needs to be re-authenticated.

Figure 5:
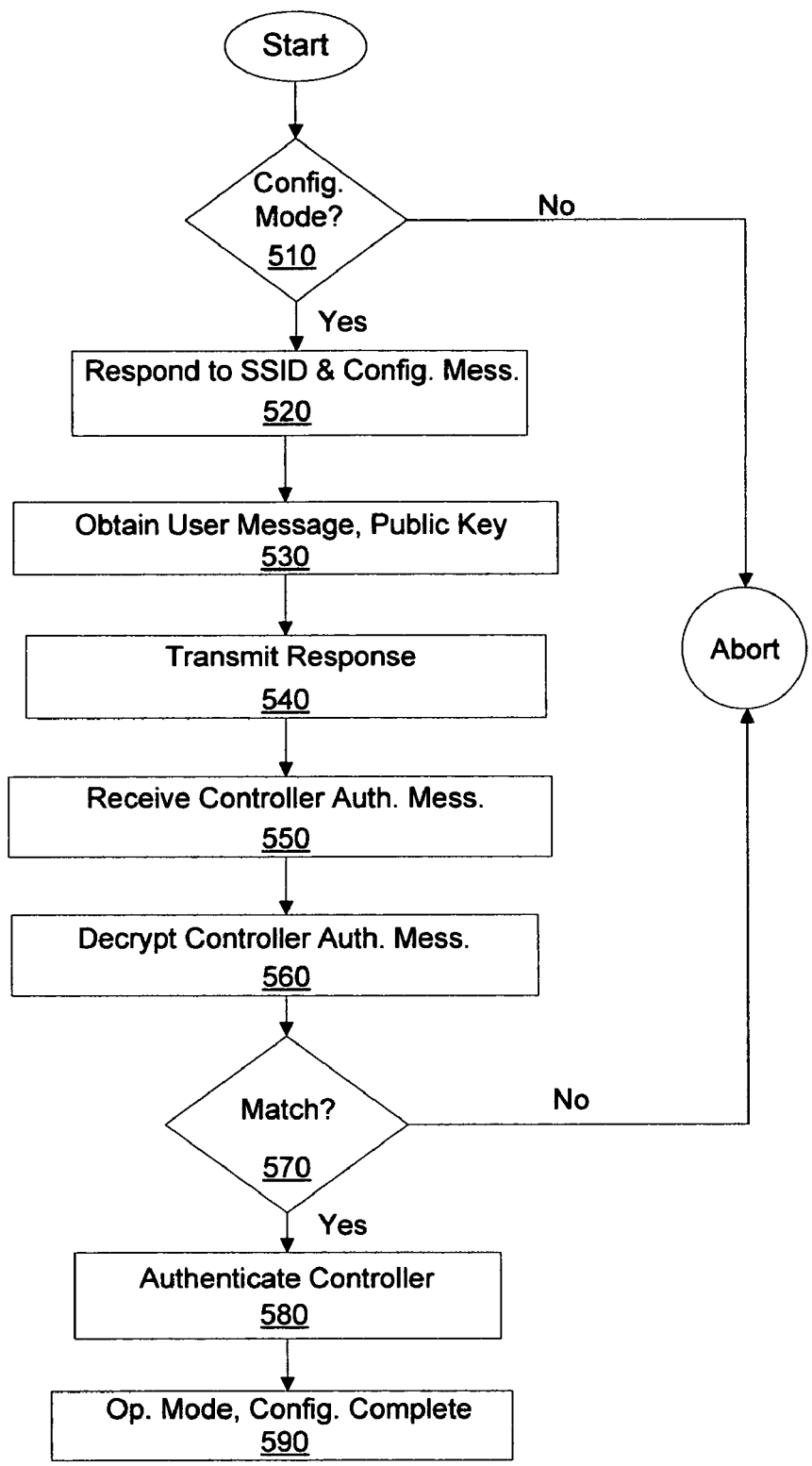
FIG. 5 is a flow chart of an example method to authenticate a controller.

FIG. 5 is a flow chart of an example method to authenticate controller 110 to further configure wireless devices for secure operation on WLAN 100. As mentioned for the method portrayed in FIG. 4, WLAN 100 may operate in compliance with the 802.11i standard for secure WLAN operations. WLAN 100 may also use the private key cryptographic system to facilitate the authentication of controller 110.

In block 510, in one example, station logic 370 of configuration manager 101B in wireless device 120 activates communicate feature 382. Communicate feature 382 determines whether configuration switch 122 has been placed into configuration mode 124. If configuration switch 122 is in configuration mode 124, the configuration process moves to block 520. If configuration switch 122 is in operation mode 126, the configuration process is aborted for wireless device 120.

In block 520, in one example, communicate feature 382 associates with the public access SSID broadcasted from controller 110 in a configuration message that also included controller 110's public key. Communicate feature 382 temporarily stores controller 110's public key in a memory (e.g., memory 125 or memory 330).

In block 530, in one example, station logic 370 activates encrypt/decrypt feature 384. Encrypt/decrypt feature 384 obtains a user message 103 and wireless device 120's public key, e.g., from memory 125 or memory 330. As described, above for FIGS. 1 and 2, user message 103 is physically entered by user 105 and maintained at wireless device 120. Encrypt/decrypt feature 384 also obtains controller 110's public key and uses that public key to encrypt the obtained user message 103 and wireless device 120's public key. Encrypt/decrypt feature 384 temporarily stores the encrypted information (e.g., in memory 125 or 330).

In block 540, communicate feature 382 obtains the encrypted information and includes it in a response message to controller 110's configuration message. The response message, for example, is transmitted to controller 110 though transceiver 128 via wireless communication link 155.

In block 550, in one example, controller 110 has authenticated wireless device 120. As a result a controller authentication message is transmitted from controller 110 via wireless communication link 155 and received through transceiver 128. The controller authentication message, in one example, includes a information encrypted with wireless device 120's public key.

In block 560, in one example, encrypt/decrypt feature 384 uses a private key associated with wireless device 120's public key to decrypt the information encrypted by controller 110. The decrypted information is temporarily stored in a memory, e.g., memory 330.

In block 570, in one example, station logic 370 activates authenticate feature 386. Authenticate feature 386 obtains the information decrypted by encrypt/decrypt feature 384 and also obtains the user message 103 that was entered by user 105 at wireless device 120. If the decrypted information includes or matches user message 103, the process moves to 580. If the decrypted information does not include or match, the configuration process is aborted for wireless device 120.

In block 580, in one example, controller 110 is authenticated based on the controller authentication message including information matching the user message 103 entered by user 105 at wireless device 120. In one example, the controller authentication message also includes information to indicate a pairwise master key to be used for 802.11i operations. This information decrypted by encrypt/decrypt feature 384 using the private key associated with wireless device 120's public key.

In block 590, in one example, configuration switch 122 is physically switched (e.g., by user 105) to operation mode 126. As a result, from the perspective of wireless device 120, configuration is complete for secure 802.11i operations (e.g., transmitting/receiving data) on WLAN 100. In one example, another configuration process at wireless device 120 is initiated if configuration switch 122 is physically switched back into configuration mode 124.

Referring again to transceivers 118, 128 and 138 in FIG. 1 and FIG. 2. In one example, these transceivers include one or more antennas to transmit and receive data between devices or elements interconnected on WLAN 100. These antennas may include, for example, an internal and/or external RF antenna. In one example, transceivers 118, 128 and 138 may include a dipole antenna, a monopole antenna, an omni-directional antenna, an end fed antenna, a circularly polarized antenna, a micro-strip antenna, a diversity antenna, or any other type of antenna suitable for sending and/or receiving wireless communication signals, blocks, frames, data items, transmission streams, packets, messages or data.

In one example, transceivers 118, 128 and 138 also includes circuitry or logic to process and/or forward data via wireless communication links in a WLAN. This circuitry or logic may include, but is not limited to, one or more radios, network interfaces, digital signal processors, etc.

Referring again to memory 115, 125 and 135 in FIGS. 1 and 2 and memory 330 in FIG. 3. Memory 115, 125, 135 or memory 330 may include a wide variety of memory media including, but not limited to, volatile memory, non-volatile memory, flash, programmable variables or states, random access memory (RAM), read-only memory (ROM), flash, or other static or dynamic storage media.

In one example, machine-readable instructions can be provided to memory 115, 125, 135 or memory 330 from a form of machine-accessible medium. A machine-accessible medium may represent any mechanism that provides (i.e., stores and/or transmits) information or content in a form readable by a machine (e.g., controller 110, wireless devices 120, 130 or configuration manager 101). For example, a machine-accessible medium includes: ROM; RAM; magnetic disk storage media; optical storage media; flash memory devices; electrical, optical, acoustical or other form of propagated signals (e.g., carrier waves, infrared signals, digital signals); etc.

In one example, machine-readable instructions can be provided to memory 115, 125, 135 or memory 330 from a form of machine-accessible medium. A machine-accessible medium may represent any mechanism that provides (i.e., stores and/or transmits) information or content in a form readable by a machine (e.g., controller 110, wireless devices 120, 130 or configuration manager 101). For example, a machine-accessible medium includes: ROM; RAM; magnetic disk storage media; optical storage media; flash memory devices; etc.

In the previous descriptions, for the purpose of explanation, numerous specific details were set forth in order to provide an understanding of this disclosure. It will be apparent that the disclosure can be practiced without these specific details. In other instances, structures and devices were shown in block diagram form in order to avoid obscuring the disclosure.

What is claimed is:

1. A method to authenticate a wireless device for secure operation on a wireless local area network, the wireless local area network including a controller, the method comprising:

broadcasting from the controller a configuration message based on the controller being physically switched to a configuration mode by a user, accepting at the controller a response from the wireless device, the response accepted based on receiving the response within a fixed time period following the broadcasting of the configuration message, the accepted response including information encrypted using the controller's public key, obtaining a message entered by the user at the controller and maintained at the controller; and authenticating the wireless device, wherein authentication is based on whether the response including the encrypted information, when decrypted with a private key associated with the controller's public key, matches the message, wherein accepting the response from the wireless device based on receiving the response within the fixed time period following the broadcasting of the configuration message, further comprises acceptance based on:

obtaining network information entered by the user at the controller and maintained at the controller, the network information to include a number of wireless devices to be authenticated; and accepting the response based on acceptance not exceeding the number of wireless devices to be authenticated.

2. A method according to claim 1, wherein the network information also includes one or more types of wireless devices to be authenticated and acceptance of the response is also based on whether the wireless device associated with the response matches at least one of the one or more types.

3. A method according to claim 2, the one or more types to include at least one type selected from the following group of: a notebook computer, a desktop computer, a printer, a scanner, a television set-top box, a television, a digital video recorder, a personal digital assistant, an audio stereo and a home appliance.

4. A method according to claim 1, further comprising:
placing the controller in an operation mode and based on the controller being physically switched back to the configuration mode by the user, authenticate one or more other wireless devices for secure operation on the wireless local area network.

5. A method according to claim 1, wherein obtaining the user message comprises obtaining the user message from a memory resident in the controller.

6. A method according to claim 1, wherein the wireless local area network operates in compliance with the IEEE 802.11i standard and based on whether the wireless device is authenticated, a pairwise master key is transmitted to the wireless device from the controller.

7. A controller for a wireless local area network comprising:
a configuration switch to place the controller in a configuration mode based on the configuration switch being physically switched by a user; and
a logic, wherein after the controller is placed in the configuration mode, the logic is to cause the controller to:
broadcast a configuration message to at least one wireless device in the wireless local area network, the configuration message to include the controller's public key;
accept a response to the configuration message, the response from at least one wireless device, acceptance based on receiving the response within a fixed time period following the broadcast of the configuration message, the response to include information encrypted using the controller's public key,
obtain a user message to be entered by a user at the controller and to be maintained at the controller;
authenticate the at least one wireless device based on whether the accepted response that includes the encrypted information, when decrypted with a private key associated with the controller's public key, matches the user message, wherein to accept the response from the wireless device based on receiving the response within the fixed time period following the broadcast of the configuration message, further comprises acceptance based on the logic to:
obtain network information entered by the user at the controller and maintained at the controller, the network information to include an identification of one or more types of wireless devices to be authenticated and acceptance of the response is also based on whether the wireless device associated with the response matches at least one of the one or more types.

8. A controller according to claim 7, wherein to accept the response from the wireless device based on receiving the response within the fixed time period following the broadcast of the configuration message, further comprises acceptance based on the logic to:
obtain additional network information entered by the user at the controller and maintained at the controller, the additional network information to include a number of wireless devices to be authenticated; and
accept the response based on acceptance not exceeding the number to be authenticated.

9. A controller according to claim 7, wherein to accept the response from the wireless device based on receiving the response within the fixed time period following the broadcast of the configuration message, further comprises acceptance based on the logic to:
obtain additional network information entered by the user at the controller and maintained at the controller, the additional network information to include one or more functions associated with one or more wireless devices to be authenticated; and
accept the response based on the response including information to indicate the wireless device is associated with at least one of the one or more functions associated with the one or more wireless devices to be authenticated.

10. A controller according to claim 7, further comprising the logic to:
place the controller in an operation mode and based on the controller being physically switched back to the configuration mode by the user, authenticate one or more other wireless devices for secure operation on the wireless local area network.

11. A controller according to claim 7, wherein the wireless local area network is to operate in compliance with the IEEE 802.11i standard and based on whether the wireless device is authenticated, a pairwise master key is transmitted to the wireless device from the controller.

12. A wireless local area network comprising:
a controller including a resident configuration switch to place the controller in a configuration mode based on the resident configuration switch being physically switched by a user; and
a wireless device including a resident configuration switch to place the wireless device in a configuration mode based on the configuration switch being physically switched by a user, the wireless device to also include a logic, wherein after the controller and the wireless device are placed in the configuration mode, the logic is to cause the wireless device to:
respond via a response message to a configuration message broadcast from the controller, the configuration message to include the controller's public key, the response message to include information encrypted using the controller's public key, the encrypted information to include the wireless device's public key and a user message, the user message entered by a user at the wireless device and maintained at the wireless device;

receive a controller authentication message from the controller based on the response message, the controller authentication message including information encrypted using the wireless device's public key, wherein the wireless device authenticates the controller based on whether the encrypted information, when decrypted with a private key associated with the wireless device's public key, includes the user message, wherein the response message further includes information to indicate a type associated with the wireless device, wherein the controller is configured to accept the wireless device, if the type is determined to match one of a list of acceptable device types stored at the controller.

13. A wireless local area network according to claim 12, the type to include at least one type selected from the following group of: a notebook computer, a desktop computer, a printer, a scanner, a television set-top box, a television, a personal digital assistant, a digital video recorder, an audio stereo and a home appliance.

14. A wireless local area network according to claim 12, further comprising the logic to:

place the wireless device in an operation mode and based on the resident configuration switch on the wireless device being physically switched back to the configuration mode by the user, respond to another configuration message broadcast from the controller, wherein the other configuration message broadcast is based on the resident configuration switch on the controller being toggled from an operation mode back to the configuration mode.

15. A wireless local area network according to claim 12, wherein the wireless local area network is to operate in compliance with the IEEE 802.11i standard and the controller authentication message further includes a pairwise master key, the pairwise master key encrypted with the wireless device's public key.

16. A machine-accessible storage medium comprising content, which, when executed by a machine causes the machine to authenticate a wireless device for secure operation on a wireless local area network, the wireless local area network including a controller physically switched into a configuration mode by a user, the authentication to cause the machine to:

broadcast from the controller a configuration message, the configuration message to include the controller's public key;

accept at the controller a response from the wireless device, the response accepted based on receipt of the response within a fixed time period following the broadcast of the configuration message, the accepted response including information encrypted using the controller's public key, obtain a user message entered by the user at the controller and maintained at the controller; and authenticate the wireless device, wherein authentication is based on whether the response including the encrypted information, when decrypted with a private key associated with the controller's public key, matches the user message, wherein to accept the response from the wireless device based on receipt of the response within the fixed time period following the broadcast of the configuration message, further comprises acceptance based on:

obtaining network information entered by the user at the controller and maintained at the controller, the network information to include a number of wireless devices to be authenticated; and accepting the response based on acceptance not exceeding the number to be authenticated.

17. A machine-accessible storage medium according to claim 16, wherein the wireless local area network operates in compliance with the IEEE 802.11i standard and based on whether the wireless device is authenticated, a pairwise master key is transmitted to the wireless device from the controller.

* * * * *